United States Patent
Satoh

(10) Patent No.: US 12,166,960 B2
(45) Date of Patent: Dec. 10, 2024

(54) SENSING PERFORMANCE EVALUATION AND DIAGNOSIS SYSTEM AND SENSING PERFORMANCE EVALUATION AND DIAGNOSIS METHOD FOR EXTERNAL-ENVIRONMENT RECOGNITION SENSOR

(71) Applicant: Hitachi Astemo, Ltd., Hitachinaka (JP)

(72) Inventor: Seiichi Satoh, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 238 days.

(21) Appl. No.: 17/622,985

(22) PCT Filed: Jul. 7, 2020

(86) PCT No.: PCT/JP2020/026522
§ 371 (c)(1),
(2) Date: Dec. 27, 2021

(87) PCT Pub. No.: WO2021/006262
PCT Pub. Date: Jan. 14, 2021

(65) Prior Publication Data
US 2022/0264081 A1    Aug. 18, 2022

(30) Foreign Application Priority Data
Jul. 10, 2019   (JP) ................ 2019-128492

(51) Int. Cl.
*H04N 7/18*    (2006.01)
*B60W 50/02*   (2012.01)
*H04N 17/00*   (2006.01)

(52) U.S. Cl.
CPC ...... *H04N 17/002* (2013.01); *B60W 50/0205* (2013.01); *B60W 2050/0215* (2013.01);
(Continued)

(58) Field of Classification Search
CPC ... H04N 17/002; H04N 7/18; B60W 50/0205; B60W 2420/408; B60W 2050/0215; B60W 2420/40; B60W 2420/403
(Continued)

(56) References Cited

U.S. PATENT DOCUMENTS 10,493,907 B2 * 12/2019 Tanaka ................ G06V 20/588
10,974,735 B2 *  4/2021 Takahashi .......... B62D 15/0285
(Continued)

FOREIGN PATENT DOCUMENTS

JP    2004-038640 A    2/2004
JP    2014-228943 A   12/2014
(Continued)

OTHER PUBLICATIONS

International Search Report with English translation and Written Opinion issued in corresponding application No. PCT/JP2020/026522 dated Oct. 20, 2020.

*Primary Examiner* — Trang U Tran
(74) *Attorney, Agent, or Firm* — Foley & Lardner LLP

(57) ABSTRACT

An object of the present invention is to provide a sensing performance evaluation and diagnosis system capable of detecting a failure sign of an external-environment recognition sensor as a diagnosis target without relying on reference information registered in advance on a map, by comparing an output of the external-environment recognition sensor as the diagnosis target with a reference output of the external-environment recognition sensor. The sensing performance evaluation and diagnosis system includes a sensing data acquisition unit that acquires sensing data around an own vehicle from an observation value of an external-environment sensor as a diagnosis target, which is mounted on the own vehicle, a surrounding information acquisition unit that acquires surrounding information data around the own vehicle from an observation value of a reference
(Continued)

external-environment sensor, a reference value calculation unit that generates reference value data based on a recognition history of relative information to a reference object, which is included in the surrounding information data, and an evaluation unit that evaluates whether or not performance of the external-environment sensor as the diagnosis target is deteriorated or evaluates a degree of performance deterioration, by comparing the sensing data related to the reference object to a threshold value set for the reference value data.

10 Claims, 10 Drawing Sheets

(52) U.S. Cl.
CPC ... *B60W 2420/40* (2013.01); *B60W 2420/403* (2013.01); *B60W 2420/408* (2024.01)

(58) Field of Classification Search
USPC .......................................................... 348/148
See application file for complete search history.

(56) References Cited

U.S. PATENT DOCUMENTS

| | | | |
|---|---|---|---|
| 11,132,852 B2* | 9/2021 | Nakamura | G07C 5/008 |
| 2014/0340518 A1 | 11/2014 | Kambe et al. | |
| 2016/0282874 A1 | 9/2016 | Kurata et al. | |
| 2019/0225266 A1* | 7/2019 | Enomoto | G01S 13/867 |
| 2020/0013242 A1 | 1/2020 | Hamada | |
| 2020/0298872 A1 | 9/2020 | Anan | |

FOREIGN PATENT DOCUMENTS

| | | |
|---|---|---|
| WO | WO-2015/068249 A1 | 5/2015 |
| WO | WO-2018/061425 A1 | 4/2018 |
| WO | WO-2019/116537 A1 | 6/2019 |

* cited by examiner

FIG. 11

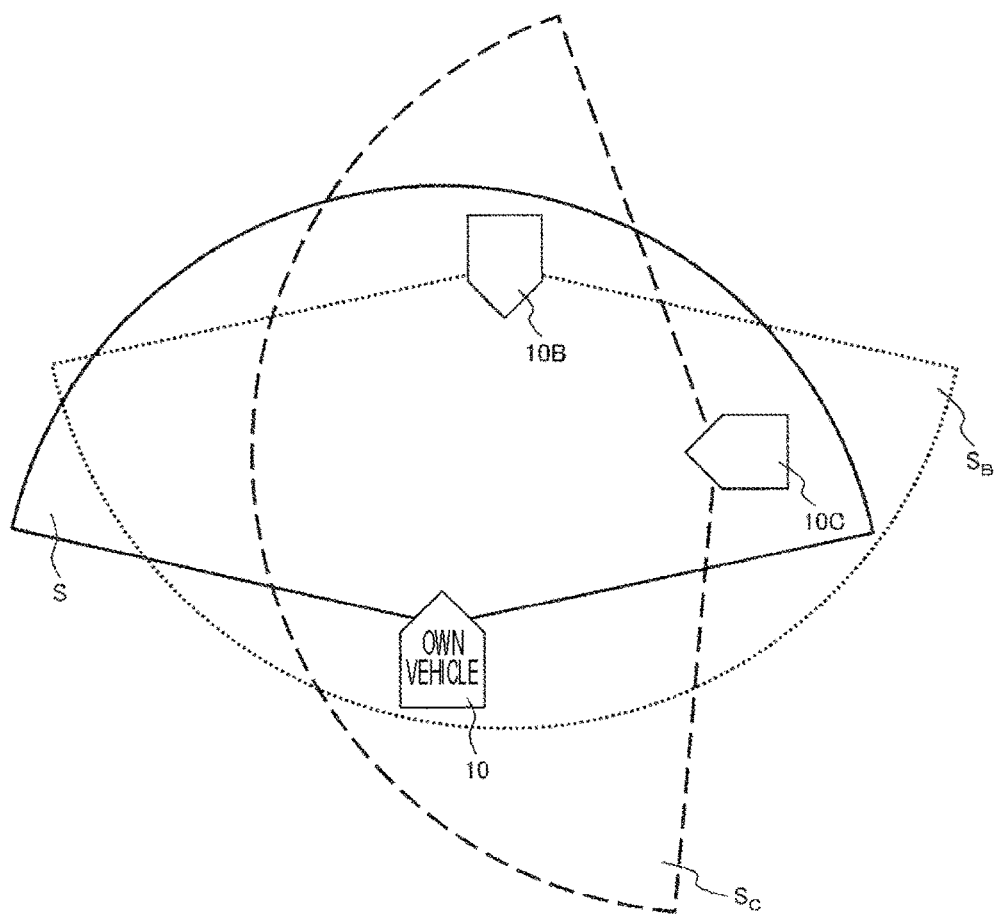

FIG. 12

|  | PERFORMANCE DETERIORATION DEGREE | SITUATION DETERMINATION | CONTROL DETAILS |
|---|---|---|---|
| CONTROL 1 | LOW | DETERIORATION TENDENCY APPEARS | NOTIFY OCCUPANT AND URGE MAINTENANCE. IF VEHICLE IS AUTOMATIC GUIDED VEHICLE, MOVE TO DEALER |
| CONTROL 2 | MIDDLE | VEHICLE CAN TRAVEL FOR TIME BEING, BUT THERE IS HIGH RISK THAT SYSTEM WILL FAIL | STOP AUTOMATIC DRIVING (THERE IS DRIVER) |
| CONTROL 3 | MIDDLE | VEHICLE CAN TRAVEL FOR TIME BEING, BUT THERE IS HIGH RISK THAT SYSTEM WILL FAIL | MOVE TO DEALER (UNMANNED AUTONOMOUS DRIVING) |
| CONTROL 4 | HIGH | SYSTEM WILL SOON FAIL | PERFORM EMERGENCY STOP IN SAFETY ZONE |

SENSING PERFORMANCE EVALUATION AND DIAGNOSIS SYSTEM AND SENSING PERFORMANCE EVALUATION AND DIAGNOSIS METHOD FOR EXTERNAL-ENVIRONMENT RECOGNITION SENSOR

TECHNICAL FIELD

The present invention relates to a sensing performance evaluation and diagnosis system capable of evaluating and diagnosing performance deterioration of an external-environment recognition sensor mounted on an automobile before an occurrence of failure.

BACKGROUND ART

In recent years, in the automobile industry, development of advanced driving support systems (ADAS) and automatic driving-related technologies has been rapidly advanced. Adaptive cruise control, lane keeping assist systems, emergency automatic brakes, and the like have already been put into practical use as functions for automating some of driving operations.

In the ADAS, the automatic driving system, and the like, various external-environment recognition sensors such as a camera and a radar are mounted on a vehicle, and appropriate control is performed in accordance with the surrounding environment of the own vehicle, which has been recognized using the external-environment recognition sensors. When failure occurs in the external-environment recognition sensor, it is not possible to perform control such as the ADAS and automatic driving. Thus, early detection of an occurrence of failure in the external-environment recognition sensor is increasingly important.

As a technique for early detecting the occurrence of failure or deterioration of an external-environment recognition sensor, a sensor failure detection device disclosed in PTL 1 is known. For example, the paragraph [0012] in PTL 1 describes that "in the present embodiment, position information of an object (for example, traffic light) having an installation position that is known in advance and information regarding the type of the object are included in map information. The failure detection device acquires the reference information from the map information, and compares the detection result of the sensor with the reference information to detect that the reliability of the sensor is low and that the sensor has failed". PTL 1 discloses the sensor failure detection device using the position information of a stationary object such as a traffic light, which is registered in advance on the map.

CITATION LIST

Patent Literature

PTL 1: International Publication No. 2018/061425

SUMMARY OF INVENTION

Technical Problem

However, the sensor failure detection device in PTL 1 evaluates the sensing performance of the external-environment recognition sensor as a diagnosis target by using the position information of the static object such as a traffic light, which is registered in advance on the map, as the reference information. Therefore, for example, when the traffic light is moved due to road construction, the position information (current position) of the traffic light sensed by the external-environment recognition sensor of the vehicle and the position information (previous position) of the traffic light registered in advance on the map are inconsistent. As a result, a normal external-environment recognition sensor that correctly senses the current position of the traffic light may be erroneously diagnosed to be abnormal.

In addition, in the sensor failure detection device in PTL 1, it is not possible to acquire the reference information necessary for evaluation and diagnosis of the external-environment recognition sensor while traveling on a farm road, a forest road, or the like in which there are few static objects registered on the map. Thus, there is also a problem that performing of diagnosis is limited to traveling in a partial area such as an urban area.

Therefore, an object of the present invention is to provide a sensing performance evaluation and diagnosis system capable of detecting a failure sign of an external-environment recognition sensor as a diagnosis target without relying on reference information registered in advance on a map, by comparing an output of the external-environment recognition sensor as the diagnosis target with a reference output of the external-environment recognition sensor.

Solution to Problem

In order to solve the above problems, according to the present invention, a sensing performance evaluation and diagnosis system includes a sensing data acquisition unit that acquires sensing data around an own vehicle from an observation value of an external-environment sensor as a diagnosis target, which is mounted on the own vehicle, a surrounding information acquisition unit that acquires surrounding information data around the own vehicle from an observation value of a reference external-environment sensor, a reference value calculation unit that generates reference value data based on a recognition history of relative information to a reference object, which is included in the surrounding information data, and an evaluation unit that evaluates whether or not performance of the external-environment sensor as the diagnosis target is deteriorated or evaluates a degree of performance deterioration, by comparing the sensing data related to the reference object to a threshold value set for the reference value data.

Advantageous Effects of Invention

According to the sensing performance evaluation and diagnosis system of the present invention, it is possible to detect a failure sign of an external-environment recognition sensor as a diagnosis target without relying on reference information registered in advance on a map, by comparing an output of the external-environment recognition sensor as the diagnosis target with a reference output of an external recognition field sensor.

BRIEF DESCRIPTION OF DRAWINGS

FIG. 11 is a diagram illustrating a form of sensing when a plurality of vehicles include surrounding acquisition units, taking a scene where an oncoming vehicle and an intersecting vehicle are present, as an example, according to Embodiment 3.

FIG. 12 is a diagram illustrating a vehicle control method based on a sensing performance diagnosis result.

DESCRIPTION OF EMBODIMENTS

Hereinafter, embodiments of a sensing performance evaluation and diagnosis system (referred to as a "diagnosis system" below) according to the present invention will be described with reference to the drawings.

Figure 1:
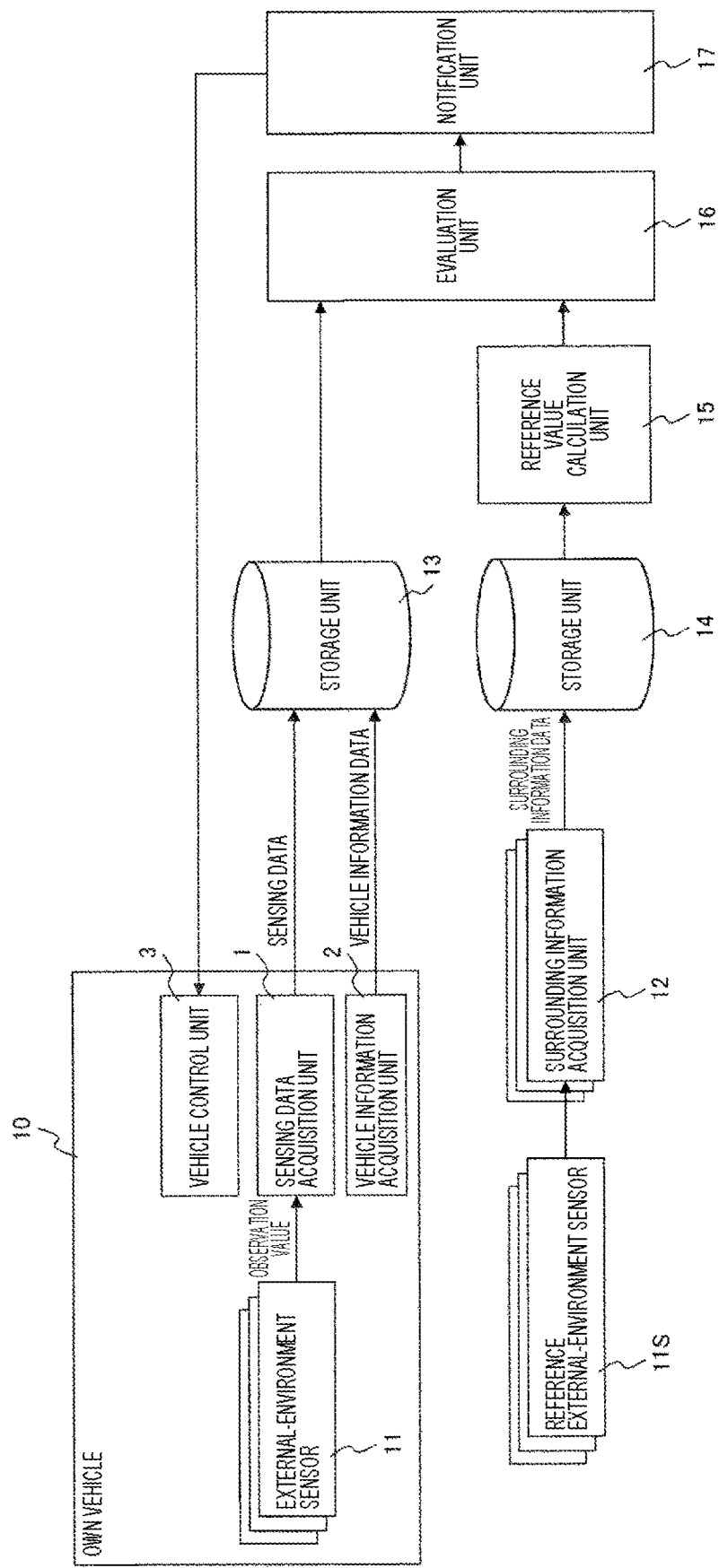
FIG. 1 is a block diagram illustrating an overall configuration example of a diagnostic system according to the present invention.

FIG. 1 is a block diagram illustrating a main part of an overall configuration of a diagnosis system in the present invention, that evaluates sensing performance of an external-environment recognition sensor (referred to as an "external-environment sensor 11" below) mounted on the own vehicle 10. The diagnostic system exemplified here includes not only the external-environment sensor 11 as a diagnosis target, which is mounted on the own vehicle 10, a sensing data acquisition unit 1, and the like, but also a reference external-environment sensor 11S, a surrounding information acquisition unit 12, storage units 13 and 14, a reference value calculation unit 15, an evaluation unit 16, and a notification unit 17, which are used for evaluating the sensing performance of the external-environment sensor 11.

In the present invention, as the reference external-environment sensor 11S, an external-environment sensor (camera, radar, Lidar, or infrared sensor) mounted on the own vehicle 10 other than the external-environment sensor 11 as a diagnosis target, or an external-environment sensor installed outside the own vehicle 10 may be used. For example, an image pickup device such as a drive recorder, which is mounted on the own vehicle 10, may be used, or an external-environment sensor (camera, radar, Lidar, or infrared sensor) mounted on another vehicle may be used. In addition, a camera of an N system installed on a road, a security camera installed in a town, a radar, a Lidar, an infrared sensor, or the like may be used. Each aspect will be described below in detail.

Embodiment 1

Figure 2:
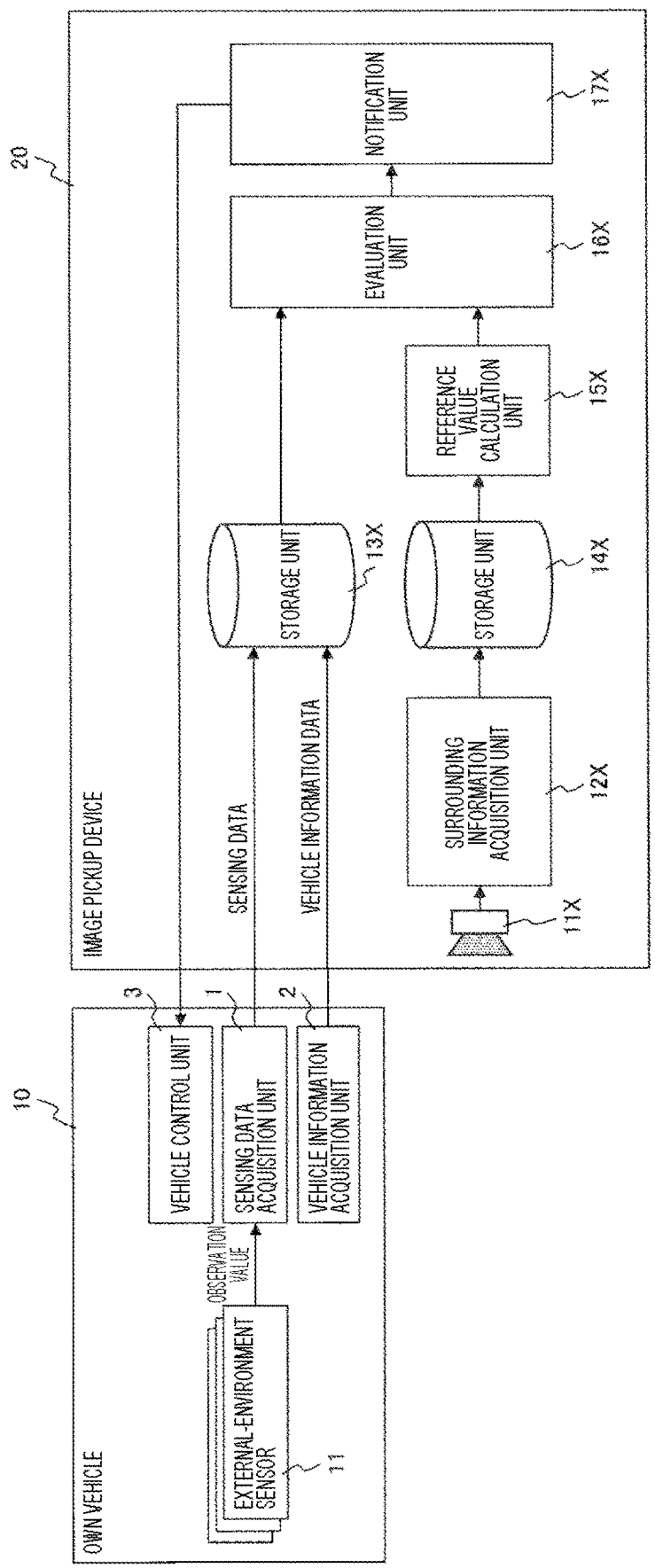
FIG. 2 is a block diagram illustrating an overall configuration example of a diagnostic system according to Embodiment 1.

FIG. 2 is a block diagram illustrating an example of an overall configuration of the diagnosis system in Embodiment 1 using the image pickup device 20 such as a drive recorder mounted on the own vehicle 10 as the reference external-environment sensor 11S that acquires reference value data as a reference of performance evaluation.

As described here, the diagnosis system in the present embodiment is a system configured by connecting the own vehicle 10 and the image pickup device 20. A controller area network (CAN), Ethernet (registered trademark), the Internet, a wireless line, or the like can be used for the connection between the own vehicle 10 and the image pickup device 20.

The image pickup device 20 includes an image pickup unit 11X, a surrounding information acquisition unit 12X, storage units 13X and 14X, a reference value calculation unit 15X, an evaluation unit 16X, and a notification unit 17X as components corresponding to the reference external-environment sensor 11S, the surrounding information acquisition unit 12, the storage units 13 and 14, the reference value calculation unit 15, the evaluation unit 16, and the notification unit 17 in FIG. 1, respectively. Details of the configuration, the operation, and the like of each element in the present embodiment will be sequentially described below.

The own vehicle 10 includes the external-environment sensor 11 as a diagnosis target, a sensing data acquisition unit 1, a vehicle information acquisition unit 2, and a vehicle control unit 3.

The external-environment sensor 11 is a sensor that recognizes the surrounding environment of the own vehicle 10, and is, for example, a camera sensor, a radar sensor, a Lidar, or an infrared sensor. The number of external-environment sensors 11 mounted on the own vehicle 10 may be one (for example, only a camera sensor) or two or more (for example, a camera sensor and a radar sensor).

The sensing data acquisition unit 1 acquires position information (referred to as "sensing data" below) of an object around the own vehicle 10, based on an observation value of the external-environment sensor 11. The sensing data includes position information of both a stopped object (referred to as a "static object" below) and a moving object (referred to as a "dynamic object" below). The position information is information regarding relative positions, relative speeds, relative distances, and the like in the front-rear direction and the lateral direction in the coordinate system of the external-environment sensor 11 mounted on the own vehicle 10. The coordinate system is not limited to the coordinate system of the external-environment sensor 11, and any coordinate system such as a ground fixed coordinate system based on a certain point may be set. When the external-environment sensor 11 itself calculates the position information of the object, the sensing data acquisition unit 1 acquires the calculation result of the external-environment sensor 11.

The vehicle information acquisition unit 2 acquires additional information (referred to as "vehicle information data" below) associated with the sensing data acquired by the sensing data acquisition unit 1. The vehicle information data is, for example, information (own vehicle speed information, steering angle information, and the like) regarding the traveling state of the own vehicle 10 and information regarding the model number of the external-environment sensor 11 used to acquire the sensing data.

The vehicle control unit 3 is a control unit that performs the ADAS, automatic driving, and the like. The vehicle control unit controls the movement of the own vehicle 10 based on a result of diagnosing the sensing performance, which is notified from the notification unit 17 described later.

Specifically, the sensing data acquisition unit 1, the vehicle information acquisition unit 2, and the vehicle control unit 3 are a single computer or a plurality of computers including hardware such as an arithmetic operation device, for example, a CPU, a main storage device such as a semiconductor memory, an auxiliary storage device, and a communication device. The functions are implemented in a manner that the arithmetic operation device executes a program loaded into the main storage device while referring to a database recorded in the auxiliary storage device. Description will be made below while a well-known technique in the computer field is appropriately omitted.

As described above, the image pickup device 20 includes the image pickup unit 11X, the surrounding information acquisition unit 12X, the storage units 13X and 14X, the reference value calculation unit 15X, the evaluation unit 16X, and the notification unit 17X. The surrounding information acquisition unit 12X, the storage units 13X and 14Y, and the like included in the image pickup device 20 are also specifically realized by a computer including hardware such as an arithmetic operation device, for example, a CPU, a main storage device such as a semiconductor memory, an auxiliary storage device, and a communication device.

The image pickup unit 11X is an image pickup sensor having a configuration necessary for image pickup, such as a lens, an autofocus mechanism, and a CCD image sensor. In the present embodiment, the image pickup unit 11X is a sensor serving as a reference when the external-environment sensor 11 as a diagnosis target is diagnosed.

The surrounding information acquisition unit 12X performs image analysis such as optical flow or deep learning on a video picked up by the image pickup unit 11X to acquire relative position information, relative speed information, or relative distance information (collectively referred to as "relative information") of an object around the own vehicle 10. The surrounding information acquisition unit 12X simultaneously acquires not only the relative position information and the like of the object in the surroundings, but also condition information (information such as a time section, weather, and a moving speed) at the time of acquiring the information and attribute information regarding the model number of the image pickup unit 11X. The position information, the condition information, and the attribute information acquired by the surrounding information acquisition unit 12X are collectively referred to as surrounding information data below.

The storage unit 13X stores the sensing data acquired by the sensing data acquisition unit 1 and the vehicle information data acquired by the vehicle information acquisition unit 2. A time stamp indicating the time when the data is acquired is added to each piece of data stored in the storage unit 13X.

The storage unit 14X stores the surrounding information data acquired by the surrounding information acquisition unit 12X. A time stamp is also added to the surrounding information data stored in the storage unit 14X.

The time stamps added by the storage units 13X and 14X are used to synchronize the sensing data and the like acquired from the external-environment sensor 11 with the surrounding information data acquired from the image pickup unit 11X.

Figure 3:
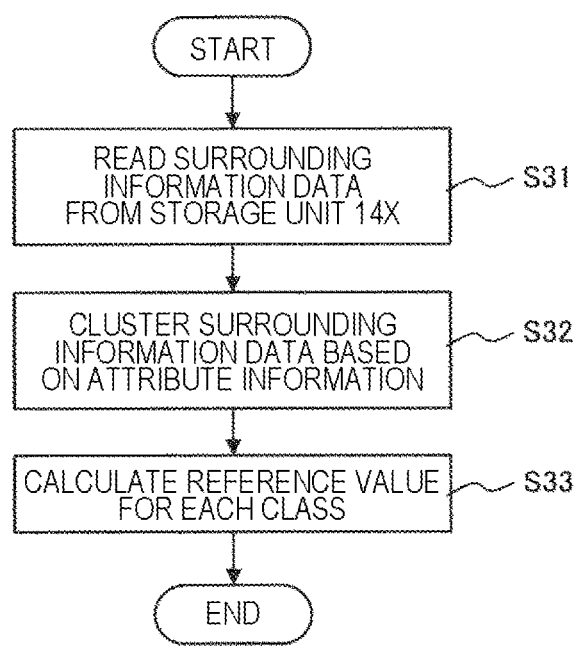
FIG. 3 is a diagram illustrating a processing flow in a reference value calculation unit.

The reference value calculation unit 15X calculates the reference value data based on the recognition history of a reference object in the surrounding information data recorded in the storage unit 14X. FIG. 3 is a flowchart illustrating a processing procedure in the reference value calculation unit 15X.

First, in Step S31, the surrounding information data recorded in the storage unit 14X is read.

Then, in Step S32, the surrounding information is clustered based on the condition information and the attribute information included in the surrounding information data. For example, a surrounding information data group corresponding to specific attribute information (for example, a model number) is extracted from a surrounding information data group recorded in the storage unit 14X.

Finally, in Step S33, the recognition history (for example, a history of a relative position to the reference object in the front-rear direction and a history of a relative speed to the reference object) of the surrounding information data for each class is calculated as the reference value data. In this manner, it is possible to generate the reference value data based on the output of the image pickup unit 11X.

Figure 4:
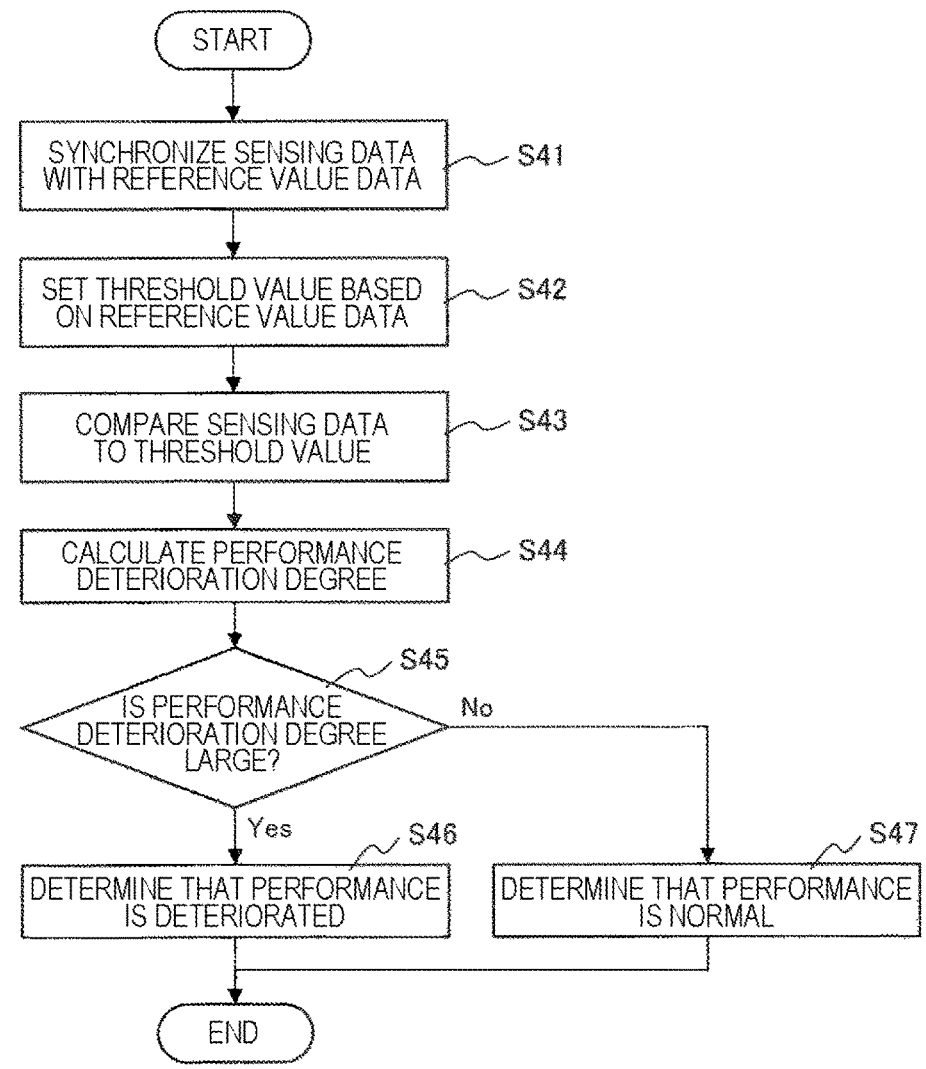
FIG. 4 is a diagram illustrating a processing flow in an evaluation unit.

The evaluation unit 16X performs evaluation and diagnosis processing of the external-environment sensor 11 as the diagnosis target by comparing the sensing data recorded in the storage unit 13X with the reference value data calculated by the reference value calculation unit 15X. FIG. 4 is a flowchart illustrating a processing procedure of the evaluation unit 16X.

First, in Step S41, both the sensing data based on the output of the external-environment sensor 11 as the diagnosis target and the reference value data based on the output of the image pickup unit 11X are synchronized with each other in order to perform comparison and diagnosis in the same time series. As a data synchronization method, a general data synchronization method may be used. For example, both pieces of data can be synchronized by setting a timing at which the value of the sensing data gradually decreases to 0 and a timing at which the value of the reference value data gradually decreases to 0, to the same time, and extracting each piece of data preceding from this time by the time required for diagnosis.

Figure 5A:
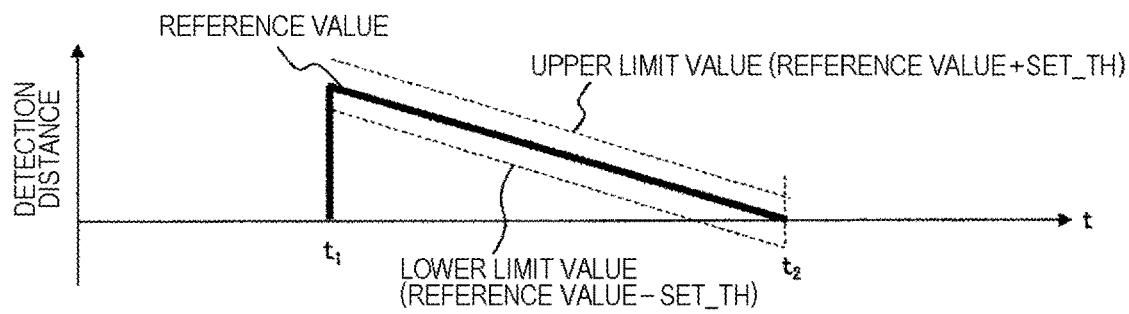
FIG. 5A is a diagram for explaining Step S42 in FIG. 4.

Then, in Step S42, a threshold value is set based on the reference value data. FIG. 5A is a diagram illustrating an example of setting the threshold value when the reference value data is a relative position (referred to as a "detection distance" below) between a predetermined reference object (for example, a traffic light) sensed by the image pickup unit 11X and the own vehicle 10 in the front-rear direction. The horizontal axis indicates the time, and the vertical axis indicates the detection distance.

For example, when the own vehicle 10 travels on a road at a predetermined speed, in Step S33 in FIG. 3, the reference value data exemplified by the solid line in FIG. 5A is calculated. That is, after the maximum detection distance is acquired at a time $t_1$ at which the reference object enters a sensing range of the image pickup unit 11X, the detection distance gradually decreases with time. The reference value data causing the detection distance to be zero at a time $t_2$ at which the own vehicle 10 passes by the reference object is calculated. In this step, threshold values (upper threshold value and lower threshold value indicated by broken lines) of ±SET_TH (%) are set with respect to the reference value data of the solid line. SET_TH is a value that can be randomly set in advance, and an appropriate value may be set in consideration of the allowable range of the sensor error.

Figure 5B:
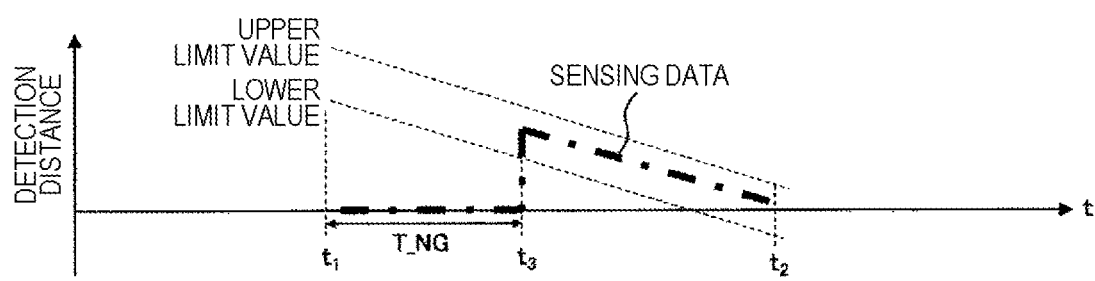
FIG. 5B is a diagram for explaining Step S43 in FIG. 4.

Then, in Step S43, the sensing data based on the output of the external-environment sensor 11 as the diagnosis target is compared with the threshold value, and a period T_NG in which the sensing data is out of the range of the threshold value is calculated. FIG. 5B illustrates an example of comparison processing performed in this step. A section T_NG in which the sensing data indicated by the one-dot chain line does not fall within the range of the threshold value, which is indicated by the broken line.

FIG. 5B illustrates a case where the deterioration form of the external-environment sensor 11 as the diagnosis target is deterioration of the sensing range. In this example, it is not possible for the external-environment sensor 11 to sense the reference object at a timing being the time $t_1$ at which the reference object enters the sensing range of the image pickup unit 11X, and it is possible to firstly detect the reference object at the time $t_2$ at which the own vehicle 10 approaches the reference object more. Thus, a period from the time $t_1$ to the time $t_3$, in which the sensing data is out of the range of the threshold value is determined as T_NG. In a period from the time $t_3$ to the time $t_2$, the sensing data falls within the range of the threshold value. Thus, such a period is not determined as T_NG. Thus, the sensing data in a period from the time $t_1$ to the time $t_3$ in which the sensing data is out of the range of the threshold value becomes candidate data suspected of performance deterioration.

FIG. 5B illustrates a case where T_NG is one continuous section. However, when the deterioration form of the external-environment sensor 11 is an increase in noise mixture or the like, sensing data fluctuating up and down may be acquired, and the sensing data may be out of the range of the threshold value for a plurality of times. In such a case, the sum of the times when the sensing data falls outside the range of the threshold value within a diagnosis time may be handled as a T_NG period.

Then, in Step S44, a sensing performance deterioration degree P (%) is calculated based on T_NG calculated in Step S43 and the following expression 1. In Expression 1, T indicates a diagnosis period in which the reference value data based on the output of the image pickup unit 11X is provided. In the example in FIG. 5A, T corresponds to a period from the time $t_1$ to the time $t_2$.

[Math. 1]

$$P = \frac{\text{T\_NG}}{T} \times 100 \quad \text{(equation 1)}$$

In Step S45, it is determined whether the sensing performance deterioration degree P satisfies the following Equation 2. In Equation 2, TH_judge is a threshold value (%) that can be randomly set.

[Math. 2]

$$P \geq TH\_\text{judge} \quad \text{(equation 2)}$$

When the ratio of T_NG to T is large and the sensing performance deterioration degree P is equal to or more than TH_judge, it is determined that the sensing performance is deteriorated and a failure sign is detected (Step S46). On the other hand, when the ratio of the period T_NG to the period T is small and the sensing performance deterioration degree P is less than TH_judge, it is determined that the sensing performance is normal (Step S47).

The notification unit 17X notifies the vehicle control unit 3 of the own vehicle 10 of the diagnosis result (whether or not the sensing performance is deteriorated and the sensing performance deterioration degree P) in the evaluation unit 16X via the CAN or the like.

As described above, according to the sensing performance evaluation and diagnosis system in the present embodiment, by comparing the output of the external-environment recognition sensor 11 as the diagnosis target with the reference output of the external recognition field sensor (image pickup unit 11X), it is possible to detect a failure sign of the external-environment recognition sensor as the diagnosis target without relaying on reference information registered in advance on a map, that is, regardless of the traveling area of the own vehicle 10.

As a result, the vehicle control unit 3 can change the control contents of the ADAS and the automatic driving in accordance with the diagnosis result of the external-environment sensor 11. In addition, when a failure sign of the external-environment sensor 11 is detected, it is possible to perform necessary maintenance such as repair or replacement of the external-environment sensor 11 before deterioration of the external-environment sensor 11 progresses.

In FIGS. 5A and 5B described above, an example in which the external-environment sensor 11 is diagnosed using a static object such as a traffic light as the reference object has been described. However, the diagnosis system in the present embodiment can diagnose the external-environment sensor 11 using a dynamic object such as another traveling vehicle as the reference object. A modification example in which the external-environment sensor 11 is diagnosed using the traveling other vehicle 10A as the reference object will be described below.

Figure 6:
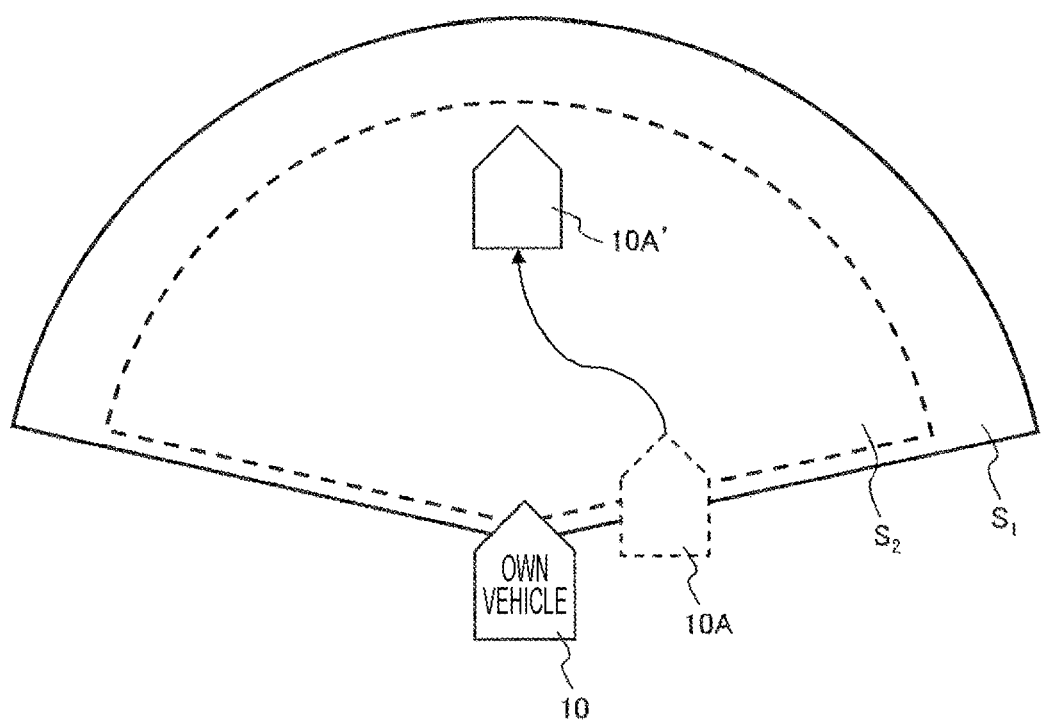
FIG. 6 is a diagram illustrating a form of sensing when a surrounding information acquisition unit is mounted on the own vehicle, taking a vehicle-cut-in scene as an example, according to Embodiment 1.

FIG. 6 illustrates a scene where another vehicle 10A changes lanes in front of the own vehicle 10 that is traveling. In this case, the other vehicle 10A is observed in both a sensing range $S_1$ of the external-environment sensor 11 as the diagnosis target and a visual field range $S_2$ of the image pickup unit 11X used as the reference external-environment sensor 11S.

In the present modification example, the reference value calculation unit 15X creates reference value data regarding the relative position, the relative speed, the relative distance, and the like between the own vehicle 10 and the other vehicle 10A, based on a video picked up by the image pickup unit 11X. The evaluation unit 16X diagnoses the sensing performance deterioration degree P and diagnoses whether or not the sensing performance is deteriorated, by comparing the sensing data of the other vehicle 10A based on the output of the external-environment sensor 11 and the reference value data based on the output of the image pickup unit 11X and using Expressions 1 and 2. The notification unit 17X notifies the vehicle control unit 3 of the diagnosis result.

Thus, even when a vehicle travels on a farm road or a forest road in which there is no appropriate static object (such as a traffic light) usable as the reference object, by selecting the other vehicle 10A traveling as the reference object, it is possible to diagnose that deterioration of the sensing performance of the external-environment sensor 11 is suspected, for example, when it is not possible for the external-environment sensor 11 to detect the other vehicle 10A capable of being detected by the image pickup unit 11X or when the position of the other vehicle 10A detected by the image pickup unit 11X is different from the position detected by the external-environment sensor 11.

Embodiment 2

Next, a diagnosis system in Embodiment 2 in which an external-environment sensor 11A of the other vehicle 10A is used as a reference external-environment sensor 11S that acquires the reference value data will be described with reference to FIGS. 7 to 9. The repetitive description of common points with Embodiment 1 will be omitted.

Figure 7:
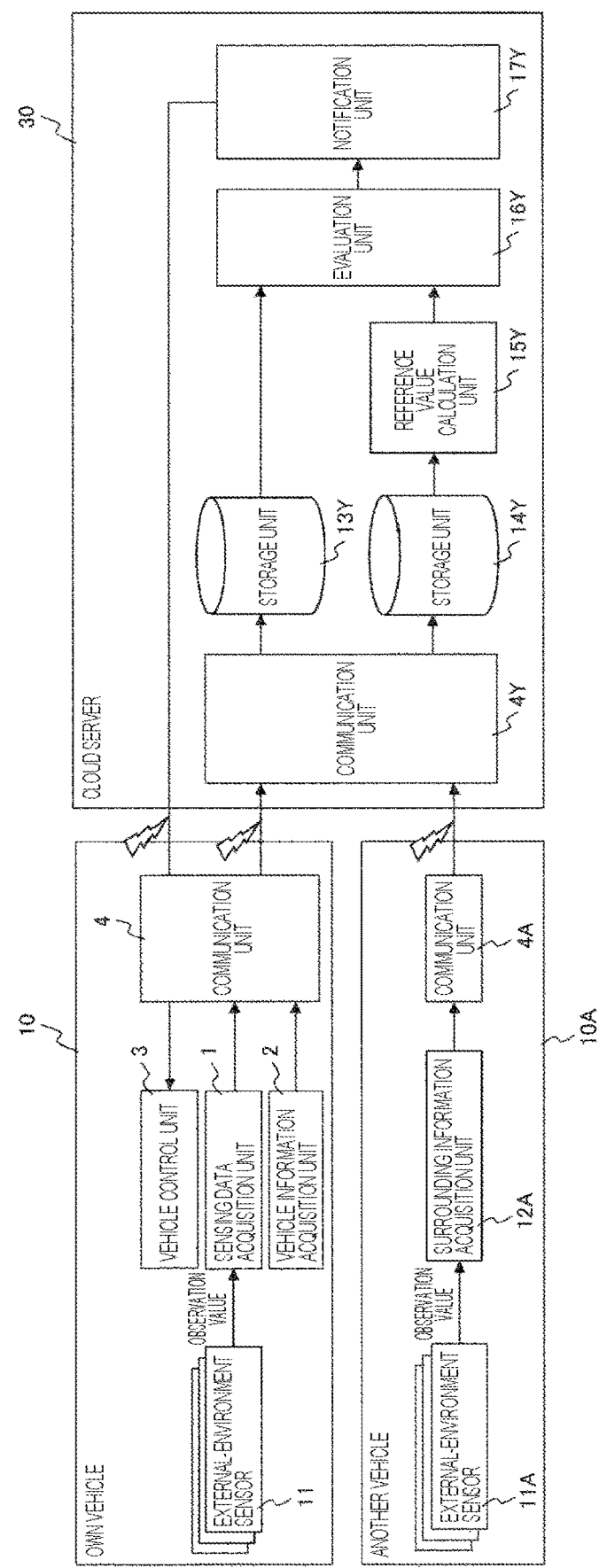
FIG. 7 is a block diagram illustrating an overall configuration example of a diagnosis system according to Embodiment 2.

FIG. 7 is a block diagram illustrating an overall configuration of the diagnostic system in Embodiment 2, that calculates reference value data from the output of the other vehicle 10A. As illustrated in FIG. 7, the diagnostic system in the present embodiment includes an own vehicle 10, the other vehicle 10A, and a cloud server 30. A general wireless public line or the like may be used for transmission and reception of data via each communication unit described later.

The own vehicle 10 includes a communication unit 4 used for communication with the cloud server 30 in addition to the external-environment sensor 11, the sensing data acquisition unit 1, the vehicle information acquisition unit 2, and the vehicle control unit 3 similar to those in Embodiment 1.

The other vehicle 10A includes an external-environment sensor 11A corresponding to the reference external-environment sensor 11S in the present embodiment, a surrounding information acquisition unit 12A that acquires surrounding information data from the external-environment sensor 11A, and a communication unit 4A used for communication with the cloud server 30.

The cloud server 30 includes a communication unit 4Y, a storage unit 13Y, a storage unit 14Y, a reference value calculation unit 15Y, an evaluation unit 16Y, and a notification unit 17Y in order to evaluate the sensing performance of the external-environment sensor 11 of the own vehicle 10 based on the output of the external-environment sensor 11A of the other vehicle 10A. The reference value calculation unit 15Y, the storage units 13Y and 14Y, and the like in the cloud server 30 are also specifically realized by a computer including hardware such as an arithmetic operation device, for example, a CPU, a main storage device such as a semiconductor memory, an auxiliary storage device, and a communication device.

The communication unit 4Y receives information (sensing data) transmitted from the communication unit 4 of the own vehicle 10 and information (surrounding information data) transmitted from the communication unit 4A of the other vehicle 10A.

The storage unit 13Y stores sensing data and vehicle information from the own vehicle 10. The storage unit 14Y stores surrounding information data from the other vehicle 10A.

The reference value calculation unit 15Y generates reference value data from the recognition history of the surrounding information data of the other vehicle 10A, which is stored in the storage unit 14Y. The evaluation unit 16Y evaluates the sensing data based on the output of the external-environment sensor 11 of the own vehicle 10 by using the reference value data calculated by the reference value calculation unit 15Y. The notification unit 17Y notifies the own vehicle 10 of the evaluation diagnosis result in the evaluation unit 16Y. The processing in the reference value calculation unit 15Y and the evaluation unit 16Y is basically equivalent to the processing in the reference value calculation unit 15X and the evaluation unit 16X in Embodiment 1 described with reference to FIGS. 3 to 5B.

Next, a specific use situation of the diagnosis system in the present embodiment will be described with reference to FIG. 8. FIG. 8 is a diagram illustrating a situation in which the sensing result of the other vehicle 10A is used as the surrounding information data, and illustrates a scene in which the external-environment sensor 11 of the own vehicle 10 that is traveling senses the other vehicle 10A traveling on the opposite lane, and the external-environment sensor 11A of the other vehicle 10A senses the own vehicle 10.

As described above, in a case where both the own vehicle 10 on which the external-environment sensor 11 as the diagnosis target is mounted and the other vehicle 10A on which the reference external-environment sensor 11S (external-environment sensor 11A) is mounted move, the coordinate systems of the external-environment sensors move relative to each other. Therefore, it is desirable that the reference value data on the fixed coordinate system is not used and is generated with the detection distance. The reason is as follows. For example, when the reference value data is intended to be calculated based on the position (X direction, Y direction) in the fixed coordinate system, it is necessary to obtain the self-positions of both vehicles with high accuracy. Thus, there is a problem that the sensing result also includes an error (error of the self-position) other than the sensing performance unless the self-position calculation with high accuracy is performed.

Figure 8:
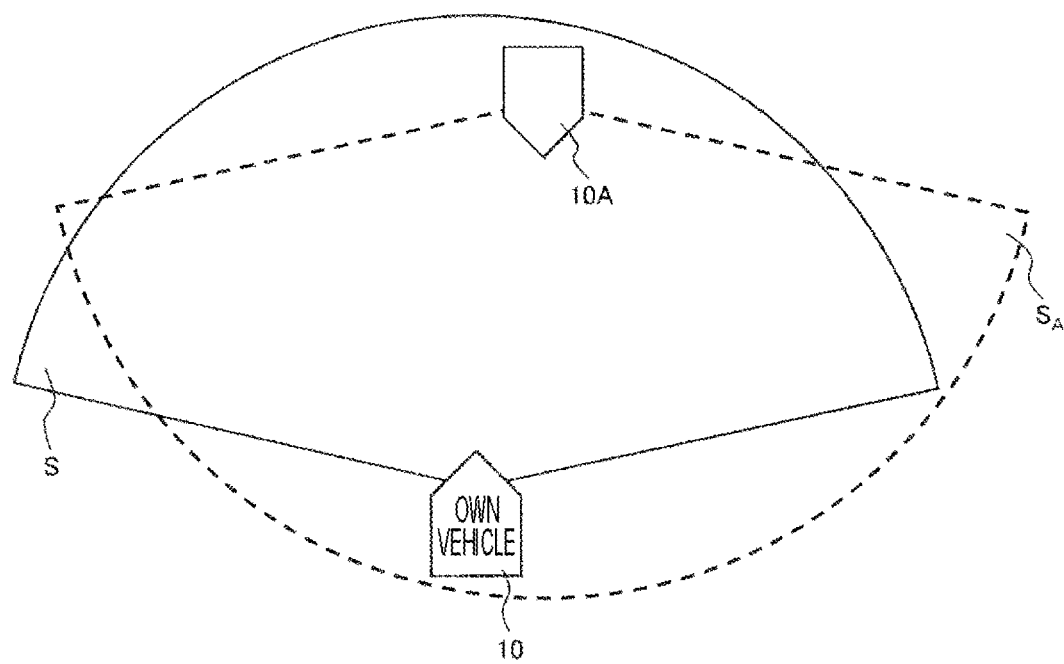
FIG. 8 is a diagram illustrating a form of sensing when one other vehicle is equipped with a surrounding acquisition unit, taking an oncoming vehicle scene as an example, according to Embodiment 2.

In FIG. 8, the other vehicle 10A enters a sensing range S of the external-environment sensor 11 indicated by the solid line, and the own vehicle 10 enters a sensing range $S_A$ of the external-environment sensor 11A indicated by the broken line. Therefore, the own vehicle 10 and the other vehicle A can sense the counterpart vehicle. For example, when the own vehicle and the other vehicle 10A are equipped with external-environment sensors (for example, cameras of the same model number) of the same model number, in principle, sensing results of the own vehicle and the other vehicle are equivalent to each other.

However, if one external-environment sensor is deteriorated, the sensing results may be different from each other. For example, when the external-environment sensor 11 of the own vehicle 10 detects that the distance to the other vehicle 10A is 80 m, and the external-environment sensor 11A of the other vehicle 10A detects that the distance to the own vehicle 10 is 100 m, it is possible to evaluate and diagnose that the observation value of any of the external-environment sensors is wrong and there is any doubt for performance deterioration, by comparing both the detection results. At this time, if the comparison result based on the output of the other vehicle 10A that the own vehicle 10 passed in the past is stored in the cloud server 30, it is possible to estimate whether the own vehicle 10 or the other vehicle 10A is deteriorated, in accordance with whether the difference in the detection distance occurs only this time or continuously. In addition, it is possible to diagnose the performance deterioration degree of the external-environment sensor 11 of the own vehicle 10 or whether or not the external-environment sensor 11 is abnormal, from the estimation result.

Figure 9:
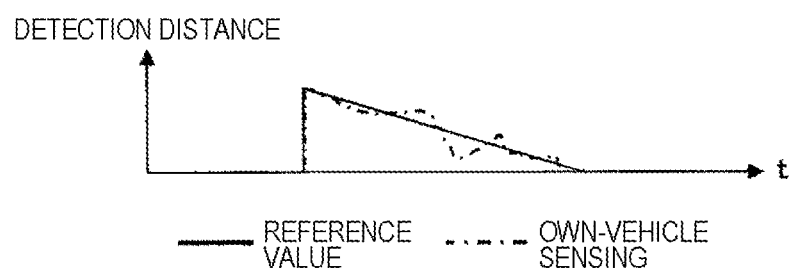
FIG. 9 is a diagram illustrating detection distances of own vehicle sensing and a reference value.

FIG. 9 is a diagram illustrating a change in the detection distance from when the own vehicle 10 and the other vehicle 10A illustrated in FIG. 8 start to perform detection until the own vehicle 10 and the other vehicle 10A pass by the counterpart vehicle. According to FIG. 9, as compared with a case where the reference value data indicated by the solid line based on the output of the external-environment sensor 11A of the other vehicle 10A monotonously decreases, it can be understood that the detection distance indicated by the one-dot chain line based on the output of the external-environment sensor 11 of the own vehicle 10 is unstable while exhibiting a decreasing tendency. As described above, when there is a difference in the recognition history of the detection distance based on the output of each external-environment sensor, it is possible to evaluate and diagnose the reliability of each external environment sensor also by the movement.

Various methods can be used for diagnosis by comparison between the reference value data and the sensing data in FIG. 9. For example, the reliability of each external-environment sensor may be diagnosed by comparing differential values and integral values between the reference value data and the sensing data.

Embodiment 3

Next, a diagnosis system in Embodiment 3 using external-environment sensors of a plurality of other vehicles as the reference external-environment sensor 11S that acquires the reference value data will be described. The repetitive description of common points with the above embodiments will be omitted.

In the diagnosis system in Embodiment 2, the external-environment sensor 10A of one other vehicle 11A is used as the reference external-environment sensor. In this diagnosis system, it may not be possible to determine which sensor of the external-environment sensor 11 of the own vehicle 10 and the external-environment sensor 11A of the other vehicle 10A has an abnormality. Therefore, in the diagnosis system in the present embodiment, by using external-environment sensors of a plurality of other vehicles, it is possible to determine an external-environment sensor and a vehicle in which an abnormality has occurred, by the principle of majority decision.

Figure 10:
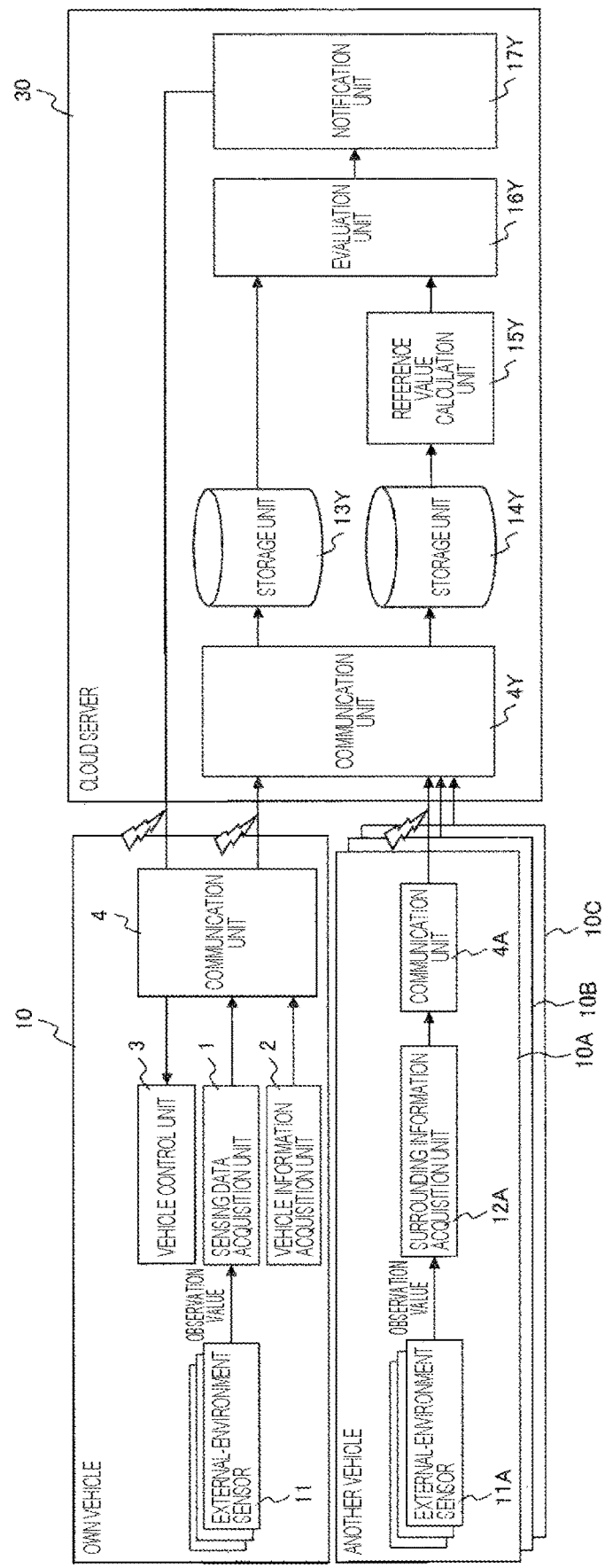
FIG. 10 is a block diagram illustrating an overall configuration example of a diagnosis system according to Embodiment 3.

FIG. 10 is a block diagram illustrating an overall configuration of the diagnosis system in Embodiment 3, that acquires reference value data from sensing data of a plurality of other vehicles 10A and the like. As illustrated in FIG. 10, the diagnostic system in the present embodiment includes an own vehicle 10, a plurality of other vehicles 10A, 10B, and 10C, and a cloud server 30.

Although not illustrated, it is assumed that the other vehicle 10B includes an external-environment sensor 11B, a surrounding information acquisition unit 12B, and a communication unit 4B, and the other vehicle 10C includes an external-environment sensor 11C, a surrounding information acquisition unit 12C, and a communication unit 4C.

The communication unit 4Y of the cloud server 30 in the present embodiment receives information (sensing data and vehicle information) transmitted from the own vehicle 10 and a plurality of pieces of surrounding information data transmitted from the other vehicles 10A, 10B, and 10C.

FIG. 11 is a diagram illustrating a specific example using pieces of surrounding information data of a plurality of other vehicles. FIG. 11 illustrates a scene where the external-environment sensor 11 of the own vehicle 10 senses the other vehicle 10B traveling on the opposite lane and the other vehicle 10C traveling on the intersecting lane, the other vehicle 10B and the other vehicle 10C being within a sensing range S indicated by the solid line, the external-environment sensor 11B of the other vehicle 10B senses the own vehicle 10 and the other vehicle 10C that are within a sensing range $S_B$ indicated by the dotted line, and the external-environment sensor 11C of the other vehicle 10C senses the own vehicle 10 and the other vehicle 10B that are within a sensing range $S_C$ indicated by the broken line.

At this time, the sensing data and the vehicle information based on the output of the external-environment sensor 11 are transmitted from the own vehicle 10 to the cloud server 30. The surrounding information data based on the output of the external-environment sensor 10B is transmitted from the other vehicle 11B to the cloud server 30. Further, the surrounding information data based on the output of the external-environment sensor 11C is transmitted from the other vehicle 10C to the cloud server 30.

The reference value calculation unit 15Y of the cloud server 30 in the present embodiment calculates a plurality of pieces of reference value data based on recognition histories of surrounding information data transmitted from a plurality of other vehicles.

Therefore, in Embodiment 3, it is possible to further improve the accuracy of the sensing performance deterioration diagnosis as compared with Embodiment 2. For example, on the premise of the situation in FIG. 11, six types of detection distances are input to the cloud server 30: (a) a detection distance of the other vehicle 10B sensed by the own vehicle 10; (b) a detection distance of the other vehicle 10C sensed by the own vehicle 10; (c) a detection distance of the own vehicle 10 sensed by the other vehicle 10B; (d) a detection distance of the other vehicle 10C sensed by the other vehicle 10B; (e) a detection distance of the own vehicle 10 sensed by the other vehicle 10C; and (f) a detection distance of the other vehicle 10B sensed by the other vehicle 10C.

If the detection distance of the own vehicle 10 does not match the paired detection distance ((a)≠(c), (b)≠(e)), and the detection distances of the other vehicle 10B and the other vehicle 10C match each other ((d)=(f)), it is also possible to immediately determine the performance deterioration of the external-environment sensor 11 of the own vehicle 10 according to the principle of majority rule. It is not always necessary to immediately determine the performance deterioration, and it is possible to further improve the accuracy of the performance deterioration diagnosis by once performing the evaluation diagnosis by adding the history of the past data in the cloud server 30.

Embodiment 4

Next, a diagnosis system in Embodiment 4 will be described with reference to FIG. 12. The repetitive description of common points with the above embodiments will be omitted.

In Embodiments 1 to 3, the processing until the notification unit 17X of the image pickup device 20 or the notification unit 17Y of the cloud server 30 notifies the vehicle control unit 3 of the own vehicle 10 of the diagnosis result has been described. Therefore, in Embodiment 4, how to control the own vehicle in accordance with the degree of the deterioration in sensing performance of the own vehicle notified to the own vehicle 10 will be described.

FIG. 12 is a table summarizing a vehicle control method for bringing the own vehicle into a safe state, based on the sensing performance deterioration degree at that time when it is diagnosed that the sensing performance of the external-environment sensor 11 of the own vehicle 10 is "deteriorated".

When the performance deterioration degree is "low", it is determined that the degree of performance deterioration is a level at which the sensing performance is slightly deteriorated but the traveling is not hindered. At this time, when there is an occupant, a warning is issued to urge the occupant to perform maintenance of the vehicle. In the case of unmanned autonomous driving, control is performed to automatically start movement to a place such as a dealer, where maintenance can be performed.

When the performance deterioration degree is "middle", it is determined that the sensing system is highly likely to fail although the vehicle can travel for the time being. At this time, when there is a driver, in order to prevent the occurrence of a suspicious movement due to autonomous driving, safety is considered, and warning is given to the driver and the autonomous driving is stopped. In the case of unmanned autonomous driving, the vehicle changes the destination to a place where maintenance can be performed at a dealer or nearby.

When the performance deterioration degree is "high", it is determined that the sensing system is in an extremely dangerous state where the sensing system will soon fail. In this case, the autonomous driving is stopped or the emergency stop is performed in the safety zone.

As described above, according to the diagnosis system in the present embodiment, it is possible to perform appropriate maintenance or the like in accordance with the performance deterioration degree of the external-environment sensor 11 of the own vehicle 10.

Embodiment 5

Next, a diagnosis system in Embodiment 5 will be described with reference to FIG. 13. The repetitive description of common points with the above embodiments will be omitted.

In the above embodiments, it has been described that reference value calculation processing and evaluation processing are normally performed. However, in a case where the processing are performed locally (in the image pickup device 20) as in Embodiment 1, an excessive load may be applied to the arithmetic processing of the sensing performance deterioration diagnosis and the like by the applied hardware specifications, and the processing of acquiring the surrounding information and calculating the reference value may be delayed. In addition, when an appropriate reference object (a traffic light, another vehicle, or the like) as a target for diagnosis is not found, it is not necessary to operate the surrounding information acquisition unit 12. Thus, it is possible to use the resources for reference value calculation processing or evaluation processing. Therefore, in the present embodiment, it is possible to determine whether or not it is necessary to perform the sensing performance deterioration diagnosis in accordance with the situation where the own vehicle 10 is placed.

Figure 13:
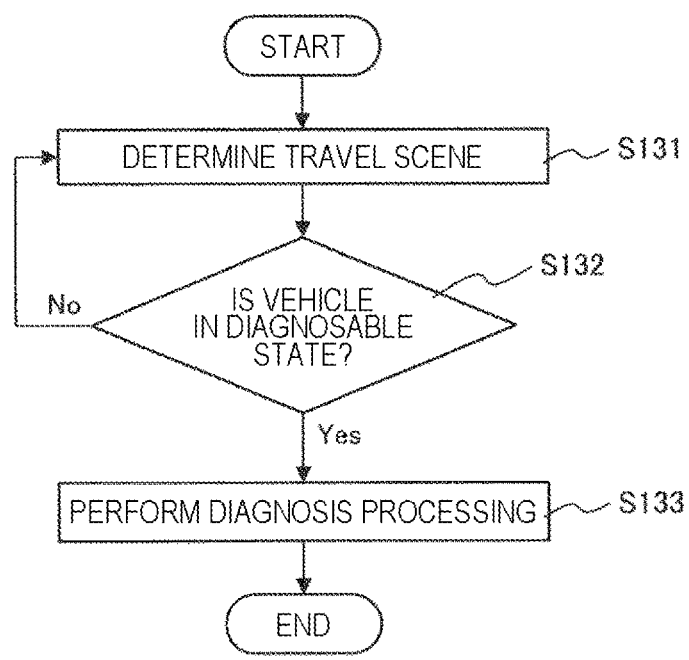
FIG. 13 is a diagram illustrating a processing flow for determining sensing performance diagnosis necessity based on a travel scene.

FIG. 13 is a diagram illustrating a processing flow of diagnosis necessity based on a travel scene of the own vehicle.

First, in Step S131, the evaluation unit 16 determines whether the travel scene (condition) is suitable for evaluation diagnosis, based on the vehicle information data. The condition suitable for the evaluation and diagnosis is a condition that there is a margin in the resources of the hardware constituting the diagnosis system. For example, the condition is a timing at which the vehicle is traveling on a straight road, a timing at which the own vehicle traveling speed is stable, a timing at which the reference object does not exist in the periphery and the surrounding information acquisition unit 12 is stopped, or the like. Specifically, the condition is a timing at which the following conditions are satisfied.

(1) The speed of the own vehicle 10 is stable (there is no large acceleration/deceleration),
(2) the steering angle of the own vehicle 10 is constant (traveling on a straight road),
(3) surrounding information data is not obtained.

The above condition is an example related to the present embodiment, and the condition can be set based on vehicle information, sensing data, relative information of an object included in the surrounding information data, or the like.

Then, in Step S132, the evaluation unit 16 determines whether or not to perform Step S133 corresponding to the diagnosis processing, in accordance with the result determined in Step S131.

Here, the diagnosis processing performed in Step S133 is the diagnosis processing described in each of the above-described embodiments. Furthermore, a data communication center or the like has a diagnosis necessity processing function based on the travel scene according to the present embodiment, so that it is possible to notify each traveling vehicle of necessity of performing the sensing performance evaluation and diagnosis according to the present invention.

Hitherto, the embodiments of the present invention have been described with reference to the drawings, but the specific configuration is not limited to the above-described embodiments, and design changes and the like without departing from the gist of the present invention are included in the present invention.

For example, the above embodiments are described in detail in order to explain the present invention in an easy-to-understand manner, and the above embodiments are not necessarily limited to a case including all the described configurations. In addition, some components in one embodiment can be replaced with the components in another embodiment, and the configuration of another embodiment can be added to the configuration of one embodiment. Regarding some components in the embodiments, other components can be added, deleted, and replaced. Specifically, in the present embodiment, the description is made using a vehicle for an object including the surroundings acquisition unit, but the object may be included in a Lidar installed as an infrastructure, a camera image, or the like.

REFERENCE SIGNS LIST

1 sensing data acquisition unit
2 vehicle information acquisition unit
3 vehicle control unit
4, 4A, 4Y communication unit
10 own vehicle
10A, 10B, 10C other vehicle
20 image pickup device
30 cloud server
11, 11A, 11B, 11C external-environment sensor
11X image pickup unit
12, 12X, 12A surrounding information acquisition unit
13, 13X, 13Y, 14, 14X, 14Y storage unit
15, 15X, 15Y reference value calculation unit
16, 16X, 16Y evaluation unit
17, 17X, 17Y notification unit

The invention claimed is:
1. A sensing performance evaluation and diagnosis system comprising:
a sensing data acquisition unit that acquires sensing data around an own vehicle from an observation value of an external-environment sensor as a diagnosis target, which is mounted on the own vehicle, wherein the sensing data includes a first distance from the own vehicle to a first surrounding vehicle and a second distance from the own vehicle to a second surrounding vehicle;

a first surrounding information acquisition unit that acquires first surrounding information data around the own vehicle from a first observation value of a first reference external-environment sensor mounted on the first surrounding vehicle, wherein the first surrounding information data includes a third distance from the first surrounding vehicle to the own vehicle;

a second surrounding information acquisition unit that acquires second surrounding information data around the own vehicle from a second observation value of a second reference external-environment sensor mounted on the second surrounding vehicle, wherein the second surrounding information data includes a fourth distance from the second surrounding vehicle to the own vehicle;

a reference value calculation unit that generates reference value data based on a recognition history of relative information to a reference object, which is included in the first surrounding information data and the second surrounding information data; and an evaluation unit that evaluates whether or not performance of the external-environment sensor as the diagnosis target is deteriorated or evaluates a degree of performance deterioration, by comparing the sensing data related to the reference object to a threshold value set for the reference value data.

2. The sensing performance evaluation and diagnosis system according to claim 1, wherein the first reference external-environment sensor further includes any of an external-environment sensor provided in the own vehicle other than the external-environment sensor as the diagnosis target, an external-environment sensor provided in another vehicle, and an external-environment sensor installed on a road.

3. The sensing performance evaluation and diagnosis system according to claim 1, wherein;
the first surrounding information acquisition unit acquires, as the first surrounding information data, relative information of any one of a relative position, a relative speed, and a relative distance of the reference object, condition information when the relative information is acquired, and attribute information regarding a model number of the first reference external-environment sensor, and
the reference value calculation unit calculates the reference value data based on the relative information associated with specific attribute information.

4. The sensing performance evaluation and diagnosis system according to claim 3, further comprising:
a vehicle information acquisition unit that acquires vehicle information data regarding a model number of the external-environment sensor as the diagnosis target, wherein the evaluation unit evaluates sensing performance of the external-environment sensor as the diagnosis target by comparing the reference value data corresponding to the model number of the external-environment sensor as the diagnosis target with the sensing data.

5. The sensing performance evaluation and diagnosis system according to claim 1, further comprising:

a notification unit that notifies a vehicle control unit that controls the own vehicle of a diagnosis result of the evaluation unit,
wherein the vehicle control unit switches control contents in accordance with the diagnosis result notified from the notification unit.

6. The sensing performance evaluation and diagnosis system according to claim 1, wherein:
the external-environment sensor as the diagnosis target, which is mounted on the own vehicle, observes the first surrounding vehicle traveling around the own vehicle as the reference object,
the first reference external-environment sensor mounted on the first surrounding vehicle observes the own vehicle as the reference object,
the first surrounding information acquisition unit is mounted on the first surrounding vehicle, and
the reference value calculation unit and the evaluation unit are provided in a cloud server that communicates with the own vehicle and the first surrounding vehicle.

7. The sensing performance evaluation and diagnosis system according to claim 6, wherein:
the sensing data includes relative position information and time information of the first surrounding vehicle recognized by the external-environment sensor as the diagnosis target,
the reference value data includes relative position information and time information of the own vehicle recognized by the first reference external-environment sensor and by the second reference external-environment sensor, and
the evaluation unit evaluates the external-environment sensor as the diagnosis target by synchronizing the sensing data and the reference value data and comparing time-series changes to each other.

8. The sensing performance evaluation and diagnosis system according to claim 1, wherein
the evaluation unit
determines whether a condition is suitable for evaluation and diagnosis, based on vehicle information data regarding an own vehicle speed or a steering angle of the
own vehicle, the sensing data, or the surrounding information data,
performs the evaluation and diagnosis when the condition is suitable for the evaluation and diagnosis, and
does not perform the evaluation and diagnosis when the condition is not suitable for the evaluation and diagnosis.

9. The sensing performance evaluation and diagnosis system according to claim 8, wherein the condition suitable for the evaluation and diagnosis is any of a timing at which a speed of the own vehicle is stable, a timing at which the steering angle of the own vehicle is constant, and a timing at which the surrounding information acquisition unit does not acquire the surrounding information data.

10. A sensing performance evaluation and diagnosis method for diagnosing an external-environment sensor as a diagnosis target, which is mounted on an own vehicle, the method comprising:
a first step of acquiring sensing data from a first observation value of the external-environment sensor as the diagnosis target, wherein the sensing data includes a first distance from the own vehicle to a first surrounding vehicle and a second distance from the own vehicle to a second surrounding vehicle;

a second step of acquiring first surrounding information data from a first observation value of a first reference external-environment sensor mounted on the first surrounding vehicle, wherein the first surrounding information data includes a third distance from the first surrounding vehicle to the own vehicle, and further acquiring second surrounding information data from a second observation value of a second reference external-environment sensor mounted on the second surrounding vehicle, wherein the second surrounding information data includes a fourth distance from the second surrounding vehicle to the own vehicle;

a third step of generating reference value data based on a recognition history of relative information to a reference object, which is included in the first surrounding information data and the second surrounding information data; and a fourth step of evaluating whether or not performance of the external-environment sensor as the diagnosis target is deteriorated or evaluating a degree of performance deterioration, by comparing the sensing data to a threshold value set for the reference value data.

\* \* \* \* \*